Figure 1:
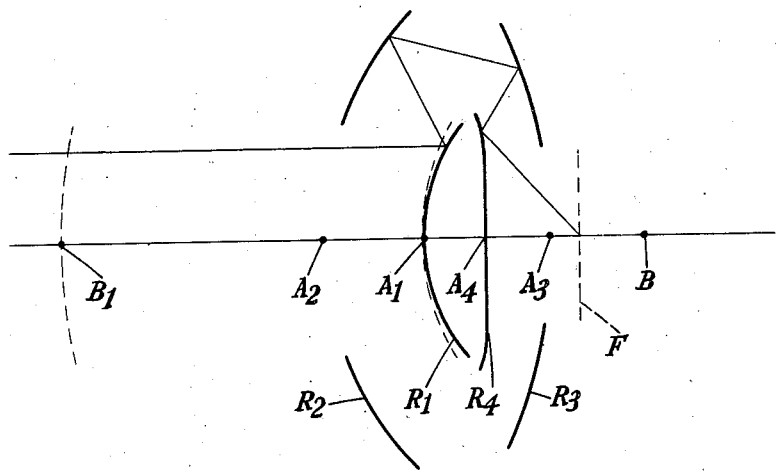

Dec. 29, 1942.   A. WARMISHAM   2,306,679
OPTICAL SYSTEM
Filed May 10, 1941   3 Sheets-Sheet 1

INVENTOR
A. WARMISHAM,
BY
ATTORNEYS

Dec. 29, 1942.  A. WARMISHAM  2,306,679
OPTICAL SYSTEM
Filed May 10, 1941  3 Sheets-Sheet 2

INVENTOR
A. WARMISHAM.
BY
ATTORNEYS

Dec. 29, 1942.            A. WARMISHAM            2,306,679
                            OPTICAL SYSTEM
            Filed May 10, 1941            3 Sheets-Sheet 3

INVENTOR
A. WARMISHAM
BY
ATTORNEYS

Patented Dec. 29, 1942

2,306,679

UNITED STATES PATENT OFFICE 2,306,679

OPTICAL SYSTEM

Arthur Warmisham, Leicester, England, assignor to Taylor, Taylor & Hobson Limited, Leicester, England, a British company Application May 10, 1941, Serial No. 392,967
In Great Britain May 2, 1940

19 Claims. (Cl. 88—57)

This invention relates to optical systems for use for example as optical objectives for photographic or projection or other purposes. Such objectives (except in some instances, for example in reflecting telescopes) have hitherto usually been constituted by a system of refracting lenses, and serious difficulties have consequently arisen in achieving any refined correction of chromatic aberration. The use of reflecting surfaces would avoid such difficulties, but existing optical systems employing curved reflecting surfaces usually have other aberrations which impose severe limitations on their practical use. Thus for instance, in order to avoid spherical aberration with a concave mirror it is usual to make it paraboloidal, but a paraboloidal mirror has serious uncorrected coma and astigmatism and can only be used in practice for a very small angular field.

The primary object of the present invention is to provide an optical system in which the optical power is supplied by curved reflecting surfaces, and in which correction is afforded not only for spherical and chromatic aberrations but also for coma and astigmatism.

To this end according to the invention the optical system includes two or more spherical or spheroidal reflecting surfaces which are axially spaced on the same optical axis and, of which at least one is spheroidal, each spheroidal surface consisting of a surface of revolution generated by rotation about its axis of reference of a curve of the form (in polar coordinates)

$$r = r_0 + A\theta^4 + B\theta^6 + \ldots \text{ higher powers of } \theta$$

wherein $r$ and $\theta$ are the variable parameters of the system of coordinates with respect to an axis of reference coincident with the optical axis and with origin at the center of curvature of the osculating sphere at the vertex, and $r_0$ is a constant of finite value equal to the radius of curvature of such osculating sphere. By positioning the vertex of such spheroidal surface substantially at the "equivalent centre of curvature" of one or more of the other reflecting surfaces and by suitable choice of the coefficients A, B . . . it is possible to arrange for the deformation of the surface from its osculating sphere to correct, at least to the first order, for the spherical aberration, coma and astigmatism of the said other reflecting surface or surfaces.

By the "equivalent centre of curvature" of a surface is meant the axial centre of curvature of the surface (that is the centre of the sphere which osculates the surface at the vertex) or, if there are any intervening elements, the image of such axial centre formed by paraxial imagery by the intervening elements. It will be clear that where the deformation of a single surface is used to effect correction of the aberrations of two or more reflecting surfaces simultaneously, such surfaces must have substantially the same equivalent centre of curvature, and the deformation will be the algebraic sum of the deformations required for the correction of the aberrations of the individual reflecting surfaces.

A more particular object of the invention is to adapt such optical system for use as an optical objective for photographic or other purposes, by making at least one of the spherical or spheroidal reflecting surfaces convergent and at least one divergent and providing means for effecting correction of the spherical aberration, coma and astigmatism of the reflecting surfaces, the combination being such as to produce an approximately flat image field.

The said correcting means may include, in addition to the above-mentioned deformation of the spheroidal surface or surfaces from their osculating spheres, one or more substantially afocal correcting surfaces each intersecting the optical axis substantially at the equivalent centre of curvature of one or more of the reflecting surfaces. Each such correcting surface may be paraxially afocal, in which case it will consist of a surface of revolution generated by rotation about the $x$-axis (that is the optical axis of the system) of a curve of the form (in Cartesian coordinates $x$, $y$)

$$x = Ay^4 + \ldots \text{ higher powers of } y$$

Such an afocal correcting surface, in the form of one of the surfaces of a plate through which the light is transmitted, is in itself known for the simultaneous correction of coma and astigmatism of a single spherical reflecting surface, but it is often preferable to make the correcting surface in the form of a reflecting surface deformed from a true plane surface by an amount dependent on the coefficients of the powers of $y$ in the above equation.

Figure 2:
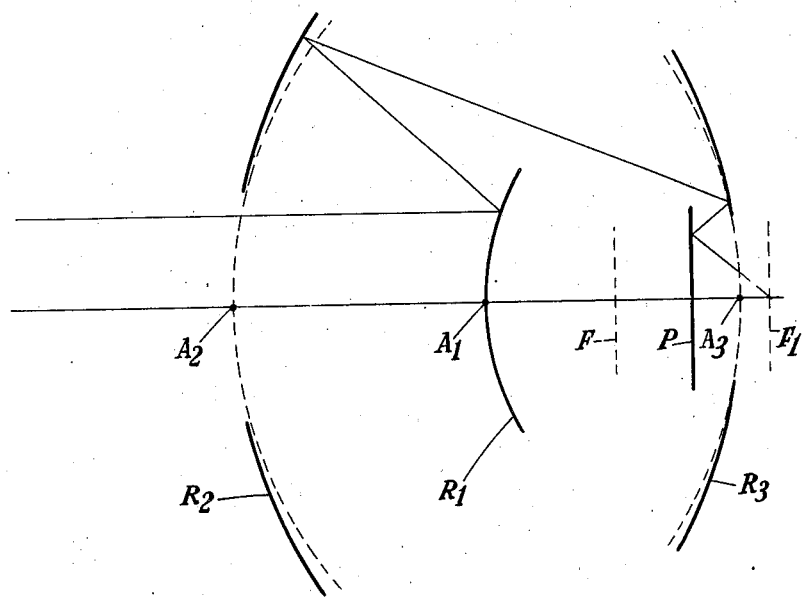
Figure 3:
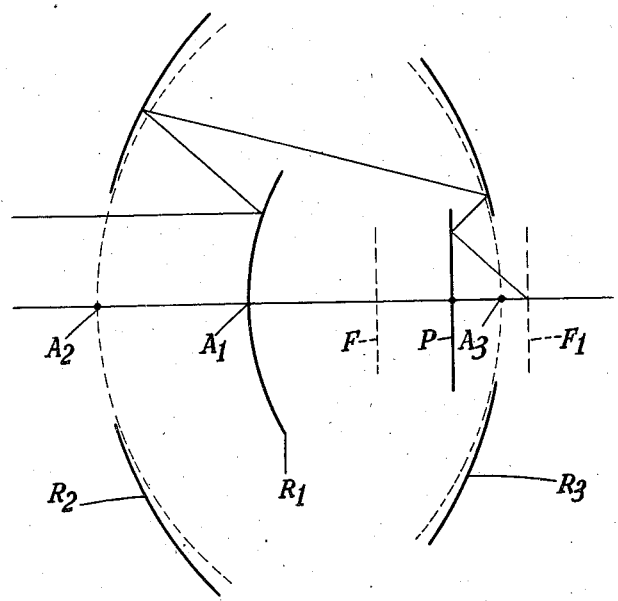
Figure 4:
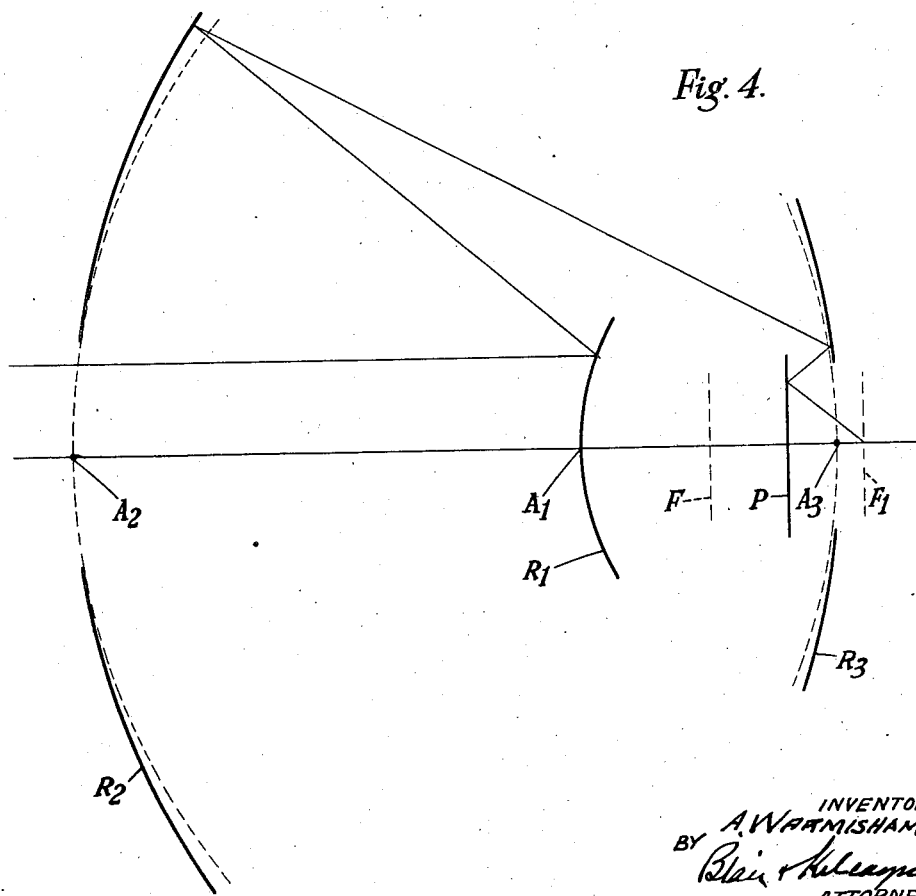
Figure 5:
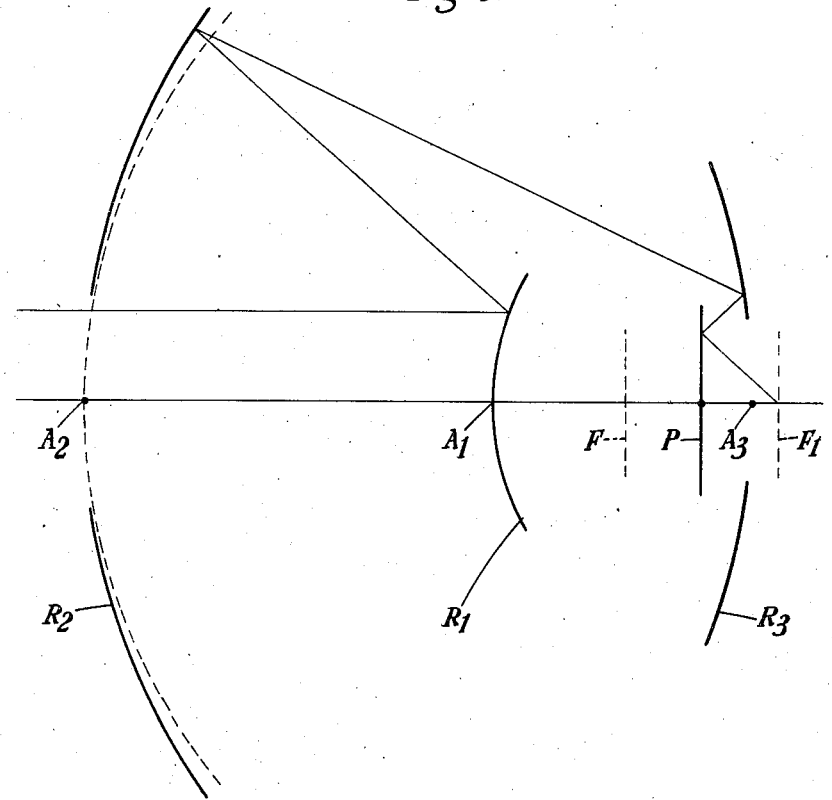
Figure 6:
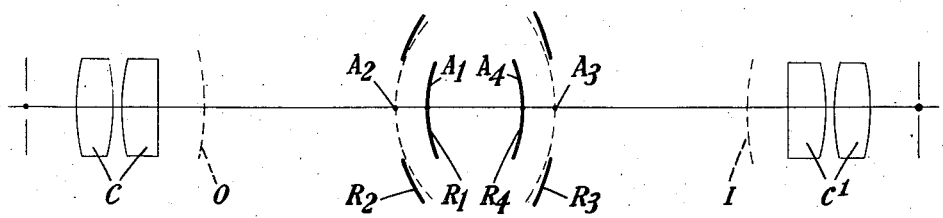

Further objects of the invention will be apparent from the appended claims and from the following description of the accompanying drawings, which show diagrammatically some convenient practical arrangements according to the invention. In these drawings Figure 1 illustrates an arrangement having two spherical surfaces, one spheroidal surface and one afocal correcting surface, Figure 2 shows an alternative arrangement having one spherical surface and two spheroidal surfaces, Figures 3 and 4 illustrate modifications of the arrangement of Figure 2, Figure 5 shows another arrangement having two spherical surfaces and one spheroidal surface, and Figure 6 shows a symmetrical arrangement having two spherical surfaces and two spheroidal surfaces, illustrated in its use as the erector in a unit sight.

In the arrangement of Figure 1, which is intended for use as an anastigmatic photographic objective, the optical system comprises four reflecting surfaces, of which two are spherical surfaces, one is a spheroidal surface of finite axial radius of curvature, and one is an afocal correcting surface. The light is first reflected at the spheroidal surface $R_1$ which is convex, and is then reflected at a concave spherical surface $R_2$ which is annular in form. Thence after reflection at the other spherical surface $R_3$ which is also concave and annular, the light is again reflected by the afocal correcting surface $R_4$ to the focal plane F. Numerical data for one such objective are given in the table below, and it may be noted that this example has been designed not only to obtain correction of the first order aberrations, but also to reduce higher order spherical aberration terms with a view to obtaining an increased aperture. In this connection it will be noticed that the convergent power of the objective is distributed between two surfaces $R_2$ $R_3$. Moreover the relative powers and positions of the surfaces have been so chosen as to make it possible to employ the deformation of one surface for correction simultaneously of the aberrations of two of the curved reflecting surfaces, so that only two deformed surfaces are required instead of three.

Thus the aberrations of the spheroidal first surface $R_1$ may be regarded as divisible into two separate sets of aberrations, namely those due to the spherical surface (shown in dotted line) osculating the surface at its vertex $A_1$, and those due to the deformation of the surface from such osculating sphere. For convenience these two sets of aberrations may be termed respectively the "spherical set" and the "aspherical set." In this particular example, the afocal correcting surface $R_4$ serves the purpose of correcting simultaneously the spherical set of aberrations of the first surface $R_1$ and the aberrations of the second surface $R_2$. The aberrations of the third surface $R_3$ are balanced by the aspherical set of aberrations of the first surface $R_1$. It has already been mentioned that the proper axial position for a correcting surface is substantially at the axial centre of curvature of the surface to be corrected or at the paraxial image of such centre formed by intervening elements. In the present example the first two surfaces $R_1$ $R_2$ have approximately the same axial centre of curvature B which lies at the paraxial image point of the fourth surface $R_4$ formed by the third surface $R_3$, whilst likewise the paraxial image of the first surface $R_1$ formed by the second surface $R_2$ intersects the optical axis substantially at the centre of curvature $B_1$ of the third surface $R_3$. The example is also such that the sum of the curvatures of the second and third surfaces, which are both convergent, is approximately equal to the curvature of the osculating sphere of the first surface, thus fulfilling the primary requirement for producing a flat image field.

For the resultant field curvature is dependent primarily on the axial curvature of the spherical and spheroidal surfaces, although in practice allowance will have to be made for the residual field curvature aberration contributed by the correcting means. Neglecting the effect of the correcting means, the theoretical requirement to produce an image field flat to the first order is that the axial curvature of the convergent reflecting surface or the sum of the axial curvatures of the convergent reflecting surfaces should be equal to the axial curvature of the divergent reflecting surface or the sum of the axial curvatures of the divergent reflecting surfaces. It is to be understood that the axial curvature of a spheroidal surface is the curvature of the spherical surface which osculates at its vertex. It will be convenient to use the term "total curvature" to represent either the axial curvature of the surface, if there is only one surface, or the sum of the axial curvatures of all the surfaces, if there are two or more surfaces. Thus the theoretical condition for a flat image field, as far as first order aberrations is concerned, is that the total curvature of the divergent reflecting surface or surfaces should be equal to that of the convergent surface or surfaces.

Expressed mathematically, the curvature of the image freed from first order astigmatism, due to reflection at a spherical surface of radius $r$, is given by the expression $$p = \frac{2}{r}$$

and is to be taken as positive if the reflection is from the concave side of the surface and negative if the reflection is from the convex side. The theoretical condition then becomes $\Sigma p = 0$.

In practice some latitude from this condition will often be preferable, partly to accommodate any residual field curvature aberration contributed by the correcting means, partly to give improved correction of the other aberrations at the expense of a slight departure from a truly flat field, and partly to counteract the relatively large effect of the higher order aberrations at moderate angles. It is, however, preferable that the total curvature of the divergent reflecting surface or surfaces should be not less than 80% and not more than 125% of the total curvature of the convergent reflecting surface or surfaces, whilst the difference between such total curvatures should be not greater than 15% of the equivalent power of the whole objective. It is to be understood that the term "power" as herein used means the reciprocal of the focal length.

In the following table $R_2$ and $R_3$ respectively represent the radii of curvature of the second and third surfaces (the positive sign indicating that the surface is convex to the front and the negative that it is concave thereto), whilst for $R_1$ is given not only the radius of curvature at the vertex $A_1$ but also the equation in polar coordinates of the generating curve for the first surface, the origin being taken at the axial centre of curvature B, and for $R_4$ is given the equation in Cartesian coordinates of the generating curve for the fourth surface, the origin being taken at the vertex $A_4$. $D_{12}$, $D_{23}$ and $D_{34}$ respectively represent the axial distances between the surfaces, the minus signs for $D_{12}$ and $D_{34}$ indicating that the second surface is in front of the first surface and that the fourth surface is in front of the third surface.

Example I

Radius  
$R_1 = +1.750$  $r = 1.750 - .218\theta^4 + \ldots$ higher order terms

Air separation  
$D_{12} = -.78$ $R_2 = +2.540$  
$D_{23} = 1.82$ $R_3 = -3.860$  
$D_{34} = -.525$ $R_4 = \infty$  $x = -.0157y^4 + \ldots$ higher order terms  
Distance of focal plane F from $R_4 = +.735$.  
Equivalent focal length 1.000

In this arrangement the afocal correcting surface $R_4$ serves for the simultaneous correction of the aberrations of two surfaces, but it may sometimes be more convenient to employ a separate afocal correcting surface for each surface to be corrected, for example one reflecting and the other transmitting the light. The arrangement may also be modified by varying the order in which the light is incident on the surfaces. Although described primarily with reference to photographic objectives, the example above given, as also the possible modifications, is equally suitable for projection purposes. It may also be used as a telescope objective, although in practice the fact that the aperture is annular may occasion some inconvenience for visual observation in a telescope.

In the arrangement of Figure 2 afocal correcting surfaces are dispensed with altogether, two of the three reflecitng surfaces being spheroidal and the third spherical. The light is first incident on the convex spherical surface $R_1$ and and then in turn on the two annular concave spheroidal surfaces $R_2$ $R_3$ in its passage to the focal plane F. It may be convenient to provide a plane reflecting surface P in order to make the direction of the emergent light convenient, so that the image $F_1$ of the focal plane F in this reflector P lies outside the objective. Numerical data for the example shown in Figure 2, which has been calculated to correct for higher order aberrations as well as first order aberrations, are given in the following table.

Example II

Radius  
$R_1 = +2.0$

Air separation  
$D_{12} = -2.0$ $R_2 = +4.0$  $r = r_0 + .2171(10^{-2})(r_0\theta)^4 + .1005(10^{-4})(r_0\theta)^6 - .8337(10^{-5})(r_0\theta)^8 - .3471(10^{-7})(r_0\theta)^{10}$  
$D_{23} = 4.0$ $R_3 = -4.0$  $r = r_0 + .1954(10^{-2})(r_0\theta)^4 - .6749(10^{-3})(r_0\theta)^6 + .1035(10^{-2})(r_0\theta)^8 - .2758(10^{-2})(r_0\theta)^{10}$  
Distance of focal plane F from $R_3 = -1.0$  
Equivalent focal length 1.000

In the equations for the surfaces $R_2$ $R_3$ in this table the parameter $(r_0\theta)$ has been used for convenience of calculation instead of $\theta$, and it will be understood that $r_0$ which is the radius of the osculating sphere, has the value $+4.0$ in both equations.

In this example the surface $R_1$ is concentric with the osculating sphere of the surface $R_2$ and the vertex $A_3$ of the third surface $R_3$ lies at their common centre, the deformation of the surface $R_3$ from its osculating sphere being such as to correct for the spherical aberration, coma and astigmatism of the first surface $R_1$ and for the spherical set of aberrations of the surface $R_2$. The aspherical set of aberrations of $R_2$ (whose vertex $A_2$ lies at the axial centre of curvature of $R_3$) balances the spherical set of aberrations of $R_3$. The total convergent curvature, that is the sum of the axial curvatures of the convergent surfaces $R_2$ and $R_3$ is equal to the total divergent curvature, that is the curvature of the surface $R_1$, and the field curvature aberration is well-corrected.

This example gives an extremely high degree of correction for the aberrations, especially spherical aberration and coma, as will be clear from the following calculations of the intersection distance (the distance from the third surface at which the ray crosses the optical axis) and the sine condition $Y_1/\sin U_3$ for a number of rays parallel to the axis and incident on the first surface at varying radial distance $Y_1$ from the axis, the angle $U_3$ being the inclination of the ray to the axis after reflection at the third surface.

| Incident ray height $Y_1$ | Intersection distance | Sine condition |
|---|---|---|
| .00 | 1.00000 | 1.0000 |
| .17 | 1.00002 | 1.0000 |
| .35 | 1.00001 | 1.0000 |
| .43 | .99902 | 1.0002 |
| .50 | .99910 | 1.0000 |

The correction of spherical aberration requires that the intersection distance should be substantially constant, and the correction of coma for reasonably small angular fields demands reasonably constant sine condition. The extremely small deviations from constancy in this example are comparable with those hitherto obtained only in the highest quality microscope objectives.

Examples III and IV, which are respectively illustrated in Figures 3 and 4 and of which approximate numerical data are given below, are both of the same general type as Example II, and differ therefrom primarily in respect of the field curvature correction.

Example III

Radius  
$R_1 = +2.0$

Air separation  
$D_{12} = -1.2$ $R_2 = +3.2$  $r = 3.2 + .0828\theta^4 +$ higher order terms  
$D_{23} = 3.2$ $R_3 = -3.2$  $r = 3.2 + .2955\theta^4 +$ higher order terms  
Distance of focal plane F from $R_3 = -1.0$  
Equivalent focal length 1.0

Example IV

Radius  
$R_1 = +2.0$

Air separation  
$D_{12} = -4.0$ $R_2 = +6.0$  $r = 6.0 + .0301\theta^4 +$ higher order terms  
$D_{23} = 6.0$ $R_3 = -6.0$  $r = 6.0 - 1.4578\theta^4 +$ higher order terms  
Distance of focal plane F from $R_3 = -1.0$  
Equivalent focal length 1.0

In Example III the first order field curvature aberration is somewhat undercorrected, the curvature of the divergent surface being 80% of the total curvature of the convergent surfaces. In Example IV on the other hand the first order field curvature aberration is strongly overcorrected, the curvature of the divergent surface being 150% of the total curvature of the convergent surfaces.

An over-corrected objective such as Example IV can usefully be applied as a low-power telescope objective in combination with a suitable eyepiece having under-corrected field curvature and free from astigmatism. Similarly an objective over-corrected for field curvature and having its spherical aberration, coma and astigmatism corrected for a specified magnification, say 25X or 50X, can be used as a microscope objective in combination with a suitable eyepiece having an under-corrected curved field free from astigmatism. Another application of an over-corrected system such as Example IV is as part of a flat-field microscope objective in combination with an under-corrected system of very high aperture. The manner in which Example IV can be utilised in such applications will be readily apparent from the description given below in connection with Example VI.

Example V, which is shown in Figure 5 and of which approximate numerical data are given below, is another example of objective with over-corrected field curvature, and in this example there are two spherical surfaces and only a single spheroidal surface. This example differs from the arrangement of Figure 2 in that the surface $R_3$ is spherical instead of spheroidal. Thus the light is first reflected at a divergent spherical surface $R_1$, then at the convergent spheroidal surface $R_2$ and finally at a convergent spherical surface $R_3$. The vertex $A_2$ of the spheroidal surface lies at the centre of curvature of the third surface $R_3$, and its deformations from the osculating sphere corrects for the first order aberrations of the third surface $R_3$, whilst the first order aberrations of the first surface $R_1$ balance out the spherical set of aberrations of the second surface $R_2$ without the necessity for the provision of a separate correcting surface. There is a little residual distortion and the first order field curvature aberration is strongly over-corrected. The system, however, finds useful practical application in combination with an under-corrected eyepiece in the manner above mentioned in connection with Example IV.

Example V

Radius      Air separation
$R_1 = +2.0$
               $D_{12} = -3.25$
$R_2 = +5.24$ $r = 5.24 + .0358\theta^4 +$ higher order terms
               $D_{23} = 5.24$
$R_3 = -5.24$
Distance of focal plane from $R_3 = -1.0$
Equivalent focal length 1.0

In another alternative, Example VI, which is shown in Figure 6 as forming part of a unit sight, a symmetrical arrangement of four reflecting surfaces is employed. The first surface $R_1$ is a divergent spherical surface concentric with the osculating sphere of the second surface $R_2$, which is a convergent spheroidal surface, the divergent spherical fourth surface $R_4$ likewise being concentric with the osculating sphere of the convergent spheroidal third surface $R_3$. The vertex $A_2$ of the second surface $R_2$ lies at the common centre of the third and fourth surfaces $R_3$ $R_4$ and its deformation from the osculating sphere corrects for the first order aberrations of such surfaces. The first order aberrations of the first and second surfaces $R_1$ $R_2$ are likewise corrected by the deformation of the third surface $R_3$ whose vertex $A_3$ lies at their common centre. Approximate numerical data for this example are given in the following table.

Example VI

Radius      Air separation
$R_1 = +1.0$
               $D_{12} = -.25$
$R_2 = +1.25$ $r = 1.25 + .0464\theta^4 +$ higher order terms
               $D_{23} = 1.25$
$R_3 = -1.25$ $r = 1.25 + .0464\theta^4 +$ higher order terms
               $D_{34} = -.25$
$R_4 = -1.0$
Equivalent focal length 1.0

This system is corrected at unit magnification for all first-order aberrations, except curvature of field which is strongly over-corrected, and will produce, from an object O convex towards the system, an equal-sized image I also convex towards the system, the algebraic sum of these convex curvatures being constant. Thus with an object O, 1.5 in front of $R_1$ and having a radius of curvature 2.5 convex towards $R_1$, the image I will be 1.5 behind $R_4$ with a radius of curvature 2.5 convex towards $R_4$. Such a copying system is well adapted to be used as an erector between an objective and an eyepiece in a telescope, the over-correction of the field curvature balancing the sum of the under-corrections of the objective and eyepiece. The particular example given is especially suitable for use as the erector in a unit sight, as shown in Figure 6, comprising a front convergent member C having a field at O free from astigmatism and convex towards the front surface $R_1$ of the system, and a rear convergent member $C_1$ similar to the front member. By making the sum of the under-corrected field curvatures of the two convergent members C $C^1$ equal to the over-corrected field curvature of the central system, a unit sight with a flat field can be obtained.

Although in the foregoing arrangements the various reflecting surfaces have been described as separated from one another by air gaps, it may sometimes be convenient (at the expense of introducing slight chromatic aberration) for such surfaces to be combined together in pairs and for each pair to be constituted by two internally reflecting surfaces on a single transparent member.

The reflecting surfaces preferably consist either of polished metal surfaces or of metallised external surfaces on glass members, and with suitable choice of the metal this has the advantage that the objective can be used not only for light within the visible range but also for ultra-violet or infra-red rays, either aluminum or silver being especially suitable for the purpose.

It will be appreciated that the numerical examples above given have been calculated for the most part to correct for first order aberrations only, and that, when higher order terms are considered, some modifications will be required. Such modifications will however usually involve only relatively slight numerical changes without any material alteration in the arrangement of the optical system.

What I claim as my invention and desire to secure by Letters Patent is:

1. An optical system including a plurality of curved reflecting surfaces axially spaced on the same optical axis and each constituted by a surface of revolution generated by rotation about its axis of reference of a curve of the form (in polar coordinates)

$$r = r_0 + A\theta^4 + B\theta^6 + \ldots \text{ higher powers of } \theta$$

wherein $r$ and $\theta$ are the variable parameters of the system of coordinates with respect to an axis of reference coincident with the optical axis and with origin at the center of curvature of the osculating sphere at the vertex, $r_0$ is a constant of finite value equal to the radius of curvature of such osculating sphere and the coefficients A, B . . . may have any chosen finite values including zero, at least one of the said surfaces having its coefficients A, B . . . lying between 10.0 and 0.02 times the equivalent focal length of the complete optical system and such that the deformation from the osculating sphere at the vertex will substantially correct at least to the first order for the spherical aberration, coma and astigmatism of at least one of the other curved reflecting surfaces and having its vertex disposed substantially at the equivalent centre of curvature of the surface to be corrected.

2. An optical objective, comprising an optical system as set forth in claim 1 having at least one of the curved reflecting surfaces convergent and at least one divergent, and means including the said deformation of at least one of the surfaces from its osculating sphere for effecting correction of the spherical aberration, coma and astigmatism of the reflecting surfaces, the combination being such as to produce a substantially flat image field.

3. An optical objective, comprising an optical system as set forth in claim 1 having at least one of the curved reflecting surfaces convergent and at least one divergent, and means including the said deformation of at least one of the surfaces from its osculating sphere for effecting correction of the spherical aberration, coma and astigmatism of the reflecting surfaces, the "total divergent curvature" of the objective being not less than 80% and not more than 125% of the "total convergent curvature," whilst the difference between such total curvatures is not greater than 15% of the equivalent power of the whole objective.

4. An optical objective comprising a plurality of curved reflecting surfaces axially spaced on the same optical axis and, of which at least one is convergent and at least one divergent, each surface being constituted by a surface of revolution generated by rotation about its axis of reference of a curve of the form (in polar coordinates)

$$r = r_0 + A\theta^4 + B\theta^6 + \ldots \text{ higher powers of } \theta$$

wherein $r$ and $\theta$ are the variable parameters of the system of coordinates with respect to an axis of reference coincident with the optical axis and with origin at the center of curvature of the osculating sphere at the vertex, $r_0$ is a constant of finite value equal to the radius of curvature of such osculating sphere and the coefficients $A, B \ldots$ may have any chosen finite values including zero, at least one of the said surfaces having its coefficients $A, B \ldots$ lying between 10.0 and 0.02 times the equivalent focal length of the complete optical system and such that the deformation from the osculating sphere at the vertex will substantially correct at least to the first order for the spherical aberration, coma and astigmatism of at least one of the other curved reflecting surfaces and having its vertex disposed substantially at the equivalent centre of curvature of the surface to be corrected, and means including the said deformation and including also at least one substantially afocal correcting surface for effecting correction of the spherical aberration, coma and astigmatism of the objective, the combination being such as to produce an approximately flat image field.

5. An optical objective as claimed in claim 4, in which the afocal correcting surface intersects the optical axis substantially at the equivalent centre of curvature of at least one of the curved reflecting surfaces.

6. An optical objective as claimed in claim 4, in which the afocal correcting surface is constituted by an approximately plane reflecting surface.

7. An optical objective as claimed in claim 4, in which the afocal correcting surface is constituted by a surface of revolution generated by rotation about the $x$-axis of a curve of the form (in Cartesian coordinates)

$$x = Ay^4 + \ldots \text{ higher powers of } y$$

where $x$ and $y$ are the variable parameters of the system of coordinates having the origin at the vertex and with the $x$-axis coincident with the optical axis.

8. An optical objective consisting of four reflecting surfaces axially spaced on the same optical axis and, of which two are spherical, one is spheroidal and the other is a substantially afocal correcting surface, the spheroidal surface and the afocal correcting surface each intersecting the optical axis substantially at the equivalent centre of curvature of at least one of the other surfaces, the objective being substantially corrected at least to the first order for spherical aberration, coma, astigmatism and curvature of field.

9. An optical objective as claimed in claim 8, in which the afocal correcting surface corrects the aberrations of one of the spherical surfaces and of an imaginary spherical surface coincident with the osculating sphere at the vertex of the spheroidal surface, and the deformation of the spheroidal surface from such osculating sphere corrects the aberrations of the other spherical surface.

10. An optical objective as claimed in claim 8, in which the light is first reflected at the spheroidal surface which is convex and then in turn at the two spherical surfaces both of which are annular and concave and finally at the afocal correcting surface.

11. An optical objective as claimed in claim 8, having numerical data substantially as set forth in the following table:

| Radius | Air separation |
|---|---|
| $R_1 = +1.750$   $r = 1.750 - .218\theta^4 + \ldots$ higher order terms | $D_{12} = -.78$ |
| $R_2 = +2.540$ | $D_{23} = 1.82$ |
| $R_3 = -3.860$ | $D_{34} = -.525$ |
| $R_4 = \infty$   $x = -.0157y^4 + \ldots$ higher order terms | |
| Distance of focal plane F from $R_4 = +.735$ | |
| Equivalent focal length 1.000 | |

12. An optical system as claimed in claim 1 having three curved reflecting surfaces of which one is divergent and the other two convergent.

13. An optical system comprising three reflecting surfaces axially spaced on the same optical axis and of which one is spherical and divergent and the other two are spheroidal and convergent, the vertex of each spheroidal surface lying substantially at the equivalent centre of curvature of at least one of the other two surfaces the combination being substantially corrected at least for spherical aberration, coma and astigmatism.

14. An optical system as claimed in claim 13, in which the curvature of the spherical surface lies between 80% and 125% of the "total curvature" of the spheroidal surfaces and differs from such total curvature by not more than 15% of the equivalent power of the system.

15. An optical system as claimed in claim 13, having numerical data substantially as set forth in the following table:

| Radius | Air separation |
|---|---|
| $R_1 = +2.0$ | |
| | $D_{12} = -2.0$ |
| $R_2 = +4.0$   $r = r_0 + .2171(10^{-3})(r_0\theta)^4 + .1005(10^{-4})(r_0\theta)^6 - .8337(10^{-5})(r_0\theta)^8 - .3471(10^{-7})(r_0\theta)^{10}$ | |
| | $D_{23} = 4.0$ |
| $R_3 = -4.0$   $r = r_0 + .1954(10^{-2})(r_0\theta)^4 - .6749(10^{-3})(r_0\theta)^6 + .1035(10^{-2})(r_0\theta)^8 - .2758(10^{-2})(r_0\theta)^{10}$ | |
| Distance of focal plane F from $R_3 = -1.0$ | |
| Equivalent focal length 1.000 | |

16. An optical system comprising two pairs of reflecting surfaces axially spaced on the same optical axis and, of which each pair comprises a convergent spheroidal surface and a divergent spherical surface concentric with the osculating sphere at the vertex of the spheroidal surface, each spheroidal surface being disposed with its vertex substantially at the common centre of the other pair.

17. An optical system as claimed in claim 16, in which the deformation of each spheroidal surface from its osculating sphere substantially corrects for the spherical aberration, coma and astigmatism of the two surfaces of the other pair.

18. The combination with an optical system as claimed in claim 16, over-corrected for field curvature aberration, of two convergent optical systems which are disposed on opposite sides of such system and are so under-corrected for field curvature aberration as substantially to balance the over-correction of the system.

19. An optical system as claimed in claim 16, having numerical data substantially as set forth in the following table:

| Radius | Air separation |
|---|---|
| $R_1 = +1.0$ | |
| | $D_{12} = -.25$ |
| $R_2 = +1.25$  $r = 1.25 + .04649t^4 +$ higher order terms | |
| | $D_{23} = 1.25$ |
| $R_3 = -1.25$  $r = 1.25 + .04649t^4 +$ higher order terms | |
| | $D_{34} = -.25$ |
| $R_4 = -1.0$ | |

Equivalent focal length 1.0

ARTHUR WARMISHAM.